United States Patent
Carlsson et al.

(10) Patent No.: US 9,542,502 B2
(45) Date of Patent: Jan. 10, 2017

(54) SYSTEM AND METHOD FOR XML SUBDOCUMENT SELECTION

(71) Applicant: Siemens Product Lifecycle Management Software Inc., Plano, TX (US)

(72) Inventors: Carl Jonas Carlsson, Mason City, IA (US); Sujit Maharana, Chaska, MN (US); John Whelan, White Bear Lake, MN (US)

(73) Assignee: SIEMENS PRODUCT LIFECYCLE MANAGEMENT SOFTWARE INC., Plano, TX (US)

(*) Notice: Subject to any disclaimer, the term of this patent is extended or adjusted under 35 U.S.C. 154(b) by 242 days.

(21) Appl. No.: 14/479,588

(22) Filed: Sep. 8, 2014

(65) Prior Publication Data

US 2016/0070815 A1   Mar. 10, 2016

(51) Int. Cl.
  *G06F 17/30* (2006.01)
(52) U.S. Cl.
  CPC .............. *G06F 17/30911* (2013.01)
(58) Field of Classification Search
  CPC ............... G06F 17/30; G06F 17/30474; G06F 17/30011; G06F 17/30911
  USPC ............................................. 707/600–899
  See application file for complete search history.

(56) References Cited

U.S. PATENT DOCUMENTS

| 7,162,485 B2 | 1/2007 | Gottlob et al. |
| 2005/0097084 A1* | 5/2005 | Balmin ............ G06F 17/30457 |
| 2007/0022105 A1 | 1/2007 | Roux |

OTHER PUBLICATIONS

W3C. XML Path Language (XPath) 2.0 (Second Edition). Edited by A. Berglund et al. W3C Recommendation, Dec. 2010, 88 pages.

* cited by examiner

*Primary Examiner* — Isaac M Woo

(57) ABSTRACT

Methods for XML subdocument selection and corresponding systems and computer-readable mediums. A method includes receiving a document having fragments with attribute/value pairs and receiving logical expressions that define relationships between fragments of the document. The method includes analyzing the logical expressions according to the document and creating an index based on the analysis that includes names of the fragments to be candidates for selection into subdocuments. The method includes extracting, from the document, all fragments named in the index and creating, in the index, an entry for each attribute/value pair. The method includes creating a plurality of subdocuments corresponding to the document and storing the subdocuments, including the respective related fragments.

17 Claims, 4 Drawing Sheets

SYSTEM AND METHOD FOR XML SUBDOCUMENT SELECTION

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved systems are desirable.

SUMMARY OF THE DISCLOSURE

Various disclosed embodiments include methods for XML subdocument selection and corresponding systems and computer-readable mediums. A method includes receiving a document having fragments with attribute/value pairs and receiving logical expressions that define relationships between fragments of the document. The method includes analyzing the logical expressions according to the document and creating an index based on the analysis that includes names of the fragments to be candidates for selection into subdocuments. The method includes extracting, from the document, all fragments named in the index and creating, in the index, an entry for each attribute/value pair. The method includes creating a plurality of subdocuments corresponding to the document and storing the subdocuments, including the respective related fragments.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

In order to process large documents with disjoint sections of inter-related fragments in a scalable way, it is often necessary to split the sets of related fragments into subdocuments. For example, a subdocument SubDoc1 may include the fragment set {Fragment A1, Fragment B1, Fragment C1, . . . }. Each subdocument can then be processed individually. The task of determining what fragments belong together in a subdocument is, using some techniques, an expensive operation with high computational complexity. Disclosed embodiments dramatically reduce the computational cost of this task.

Figure 1:
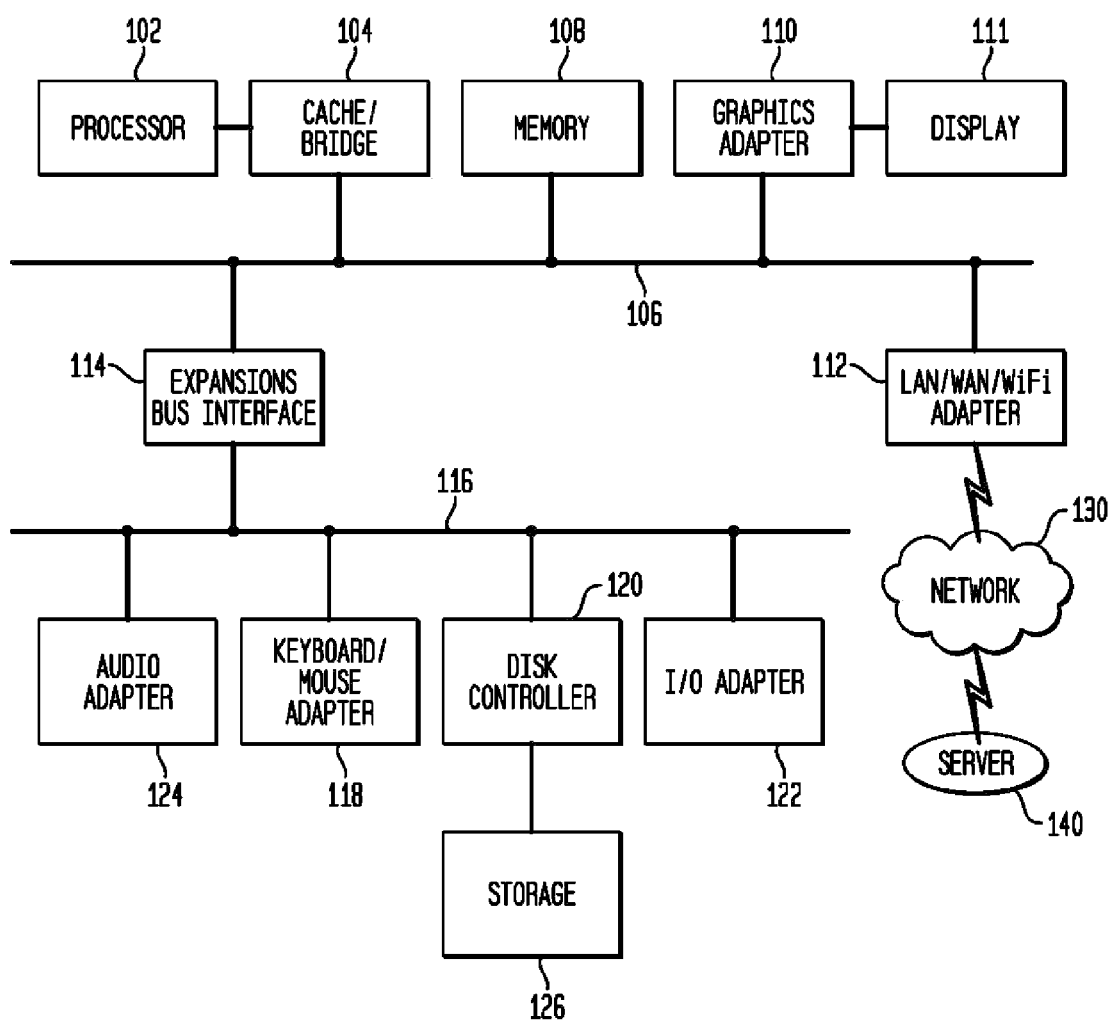
FIG. 1 illustrates a block diagram of a data processing system in which an embodiment can be implemented.

FIG. 1 illustrates a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

As described above, it is often necessary to "factor" large documents into a plurality of subdocuments that each contains related fragments of the original document. A fragment refers, in XML embodiments, to part of an XML document, plus possibly some extra information, that may be useful to use and interchange in the absence of the rest of the XML document, such as a subtree. Disclosed embodiments employ custom search indexes in an XPath/XML environment to achieve fast and scalable factorization of arbitrarily large XML documents. XPath, the XML Path Language, is a query language for selecting nodes from an XML document. In addition, XPath may be used to compute values (e.g., strings, numbers, or Boolean values) from the content of an XML document. The XML Path Language (XPath) 2.0 (Second Edition) specification can be found, at time of filing, at http://www.w3.org/TR/xpath20/.

Figure 2:
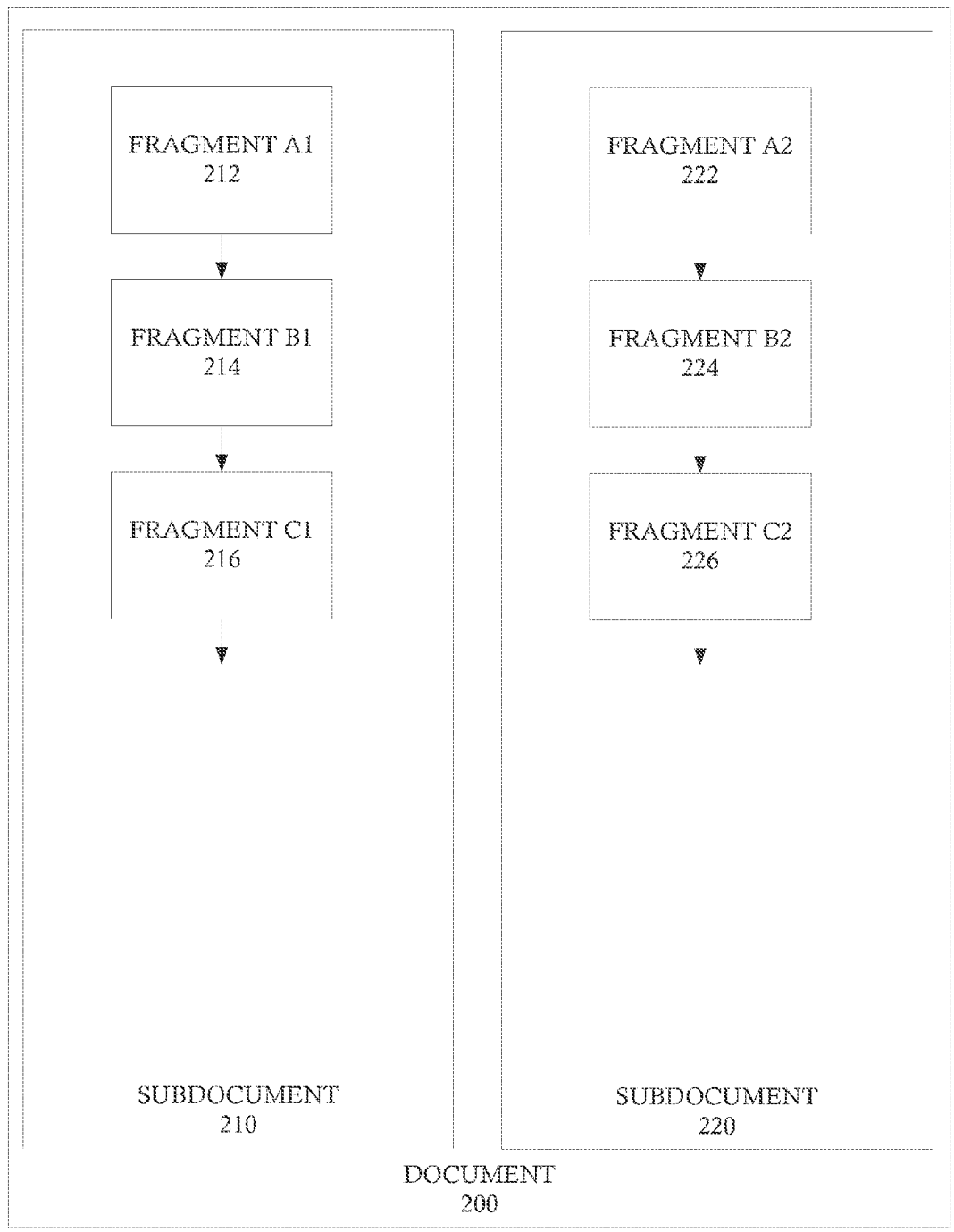
FIG. 2 illustrates an example of documents, subdocuments, and fragments, in accordance with disclosed embodiments.

FIG. 2 illustrates an example of documents, subdocuments, and fragments, in accordance with disclosed embodiments. This figure shows a document 200 that can be divided into subdocument 210 and subdocument 220. Subdocument 210 includes fragment A1 212, fragment B1 214, fragment C1 216, and potentially many fragments. Subdocument 220 includes fragment A2 222, fragment B2 224, fragment C2 226, and potentially many fragments. There may be any number of subdocuments, each containing any number of fragments.

One way to factor a large document is for the system to first scan the input document for the top level fragments (A1, A2, . . . ). Then, for each of them, the system can scan the input document for the level 2 fragments (B1, B2, . . . ) and so forth. The problem with this approach is that its general computational complexity is $O(n^2)$, since as the size of the input document doubles, so does the number of top level fragments. Thus, the number of for-each iterations to obtain the level 2 fragments will double. Furthermore, since the document has doubled in size, the time spent on each iteration to find the sub-fragment(s) will double. This means that when the size of the input doubles, the time spent to identify level 2 fragment quadruples.

This scalability problem is encountered when the relations between fragments in subdocuments are defined as XPath expressions and commercial XML tools are used to perform the selection.

Disclosed embodiments can select inter-related XML fragments, identified by logical expressions (XPath or otherwise), from an XML document, in linear time and using constant memory (when kept in a disk-backed database) or linear memory (when kept in an all-memory hashtable). That is, according to various embodiments, as the size of the input document doubles, so does the time necessary to perform the selection, but the amount of memory used is unaffected. This scalability is superior to existing approaches and presents a significant technical advantage in providing support for processing large documents with limited CPU and memory resources.

Rather than scanning the input document repeatedly, disclosed embodiments can analyze all logical expressions that are to be used matching up the fragments a-priori, then perform a single-sweep analysis of the input document. The system can extract all possible fragment matches and put them in an index with $O(1)$ lookup time. The subdocuments can then be built from this index in $O(n)$ time.

Figure 3:
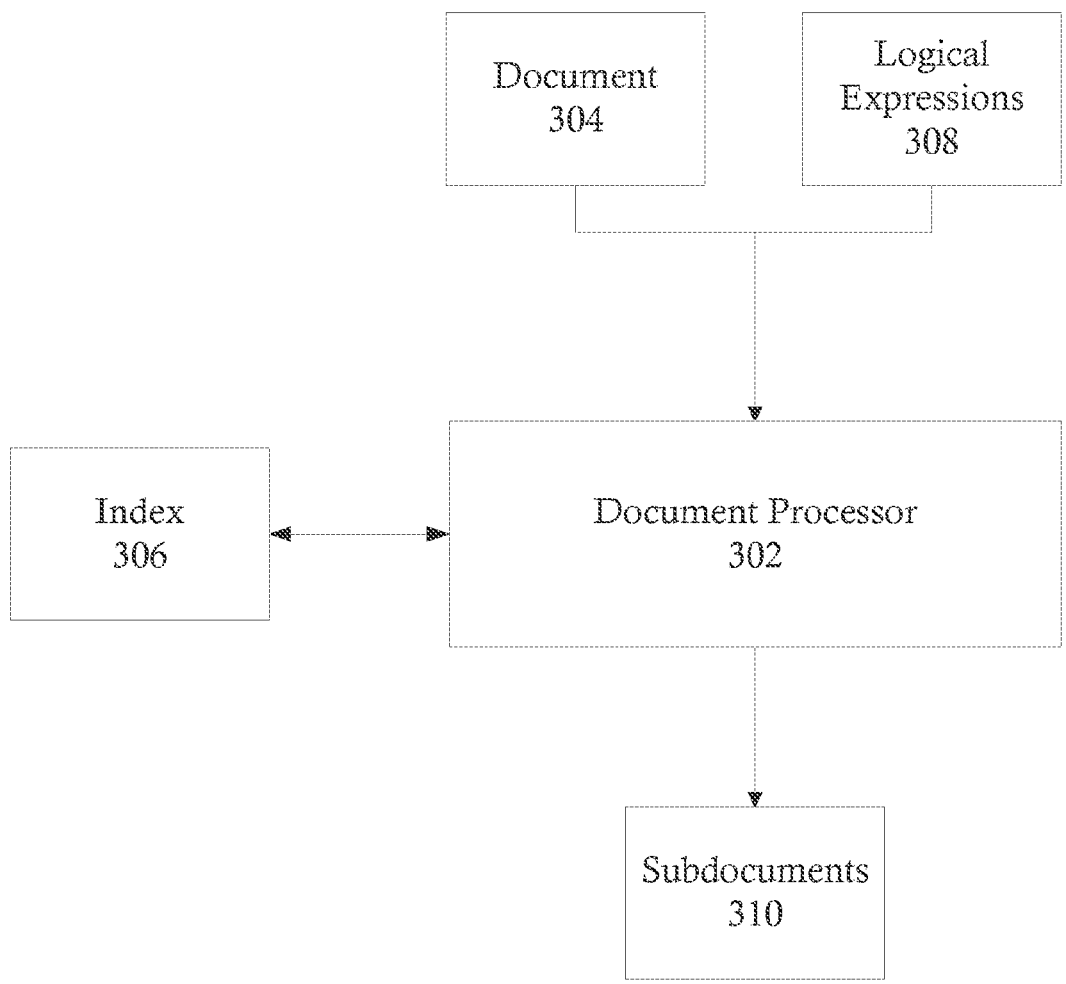
FIG. 3 illustrates a block diagram of document processing elements in accordance with disclosed embodiments.

FIG. 3 illustrates a block diagram of document processing elements in accordance with disclosed embodiments. The process described in more detail below can be performed by a document processor 302, which can be implemented, for example, by a data processing system 100.

Document processor 302 can receive as input a document 304, which can be an XML document or other document having fragments with attribute/value pairs, such as nodes in an XML file. Document 304 can be stored, for example, in memory 108 or storage 126 of data processing system 100. Document processor can also receive as input logical expressions 308, including but not limited to XPath expressions, that define relationships between fragments of the document 304. Logical expressions 308 can be stored, for example, in memory 108 or storage 126 of data processing system 100.

Document processor 302 can create, read from, and write to an index 306 as described below. Index 306 can be implemented as a table or other data structure, and can be stored, for example, in memory 108 or storage 126 of data processing system 100. In some implementations, index 306 can be implemented as multiple indices, including a first index that is based on analyzing the logical expressions, essentially containing the names of fragments that are candidates for future selection into subdocuments as well as names of attributes referenced by the expressions, and a second index populated by scanning the input document while referencing the first index. Each time a fragment is encountered in the input document with a name matching in the first index, the content of this fragment is added to the second index. The description herein of a single index is intended to include multiple-index implementations unless specifically described otherwise.

Document processor 302 can create a plurality of subdocuments 310, as described below, which can be stored, for example, in memory 108 or storage 126 of data processing system 100. Subdocuments 310 are respective subsets of the fragments of document 304, where the fragments of each subdocument 310 are related to each other according to one or more of the logical expressions 308.

Figure 4:
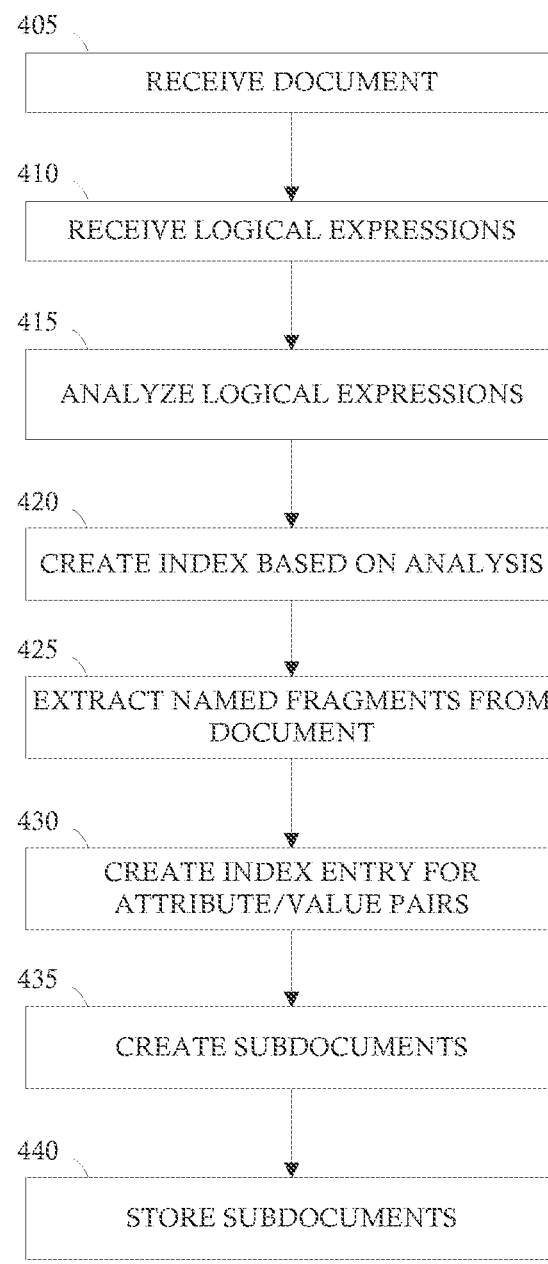
FIG. 4 illustrates a flowchart of a process in accordance with disclosed embodiments.

FIG. 4 depicts a flowchart of a process in accordance with disclosed embodiments that may be performed, for example, by a data processing system 100 implementing a document processor, referred to generally as the "system" below. This example uses a single index.

The system receives a document having fragments with attribute/value pairs (405). "Receiving," as used herein, can include loading from storage, receiving from another device or process, receiving via an interaction with a user, or otherwise. The fragments can be subtrees in an XML file.

The system receives logical expressions that define relationships between fragments of the document (410).

The system analyzes all of the logical expressions to identify fragment names and attributes (415). This can include evaluating each logical expression with respect to fragment attributes on which it operates.

The system creates an index based on the analysis (420). The index includes the names of all fragments that are candidates for selection into subdocuments, as well as, for each such fragment name, all of its attributes that are used in its corresponding logical expressions.

The system extracts, from the document, all fragments named in the index (425). This step can include, for each fragment, parsing out the values of each attribute according to the logical expressions.

The system creates, in the index, an entry for each attribute/value pair (430). The attribute/value can be used as key in the index and the full fragment can be used as a corresponding value in the index.

The system creates a plurality of subdocuments corresponding to the document (435). This can be performed by the system first finding all top level fragments A1, A2, . . . An in the index. Then, for each top-level fragment, the system finds its related second-level fragment(s) Bx. Then for each second-level fragment Bx, the system finds its related third level fragment Cx. Each of the related fragments is stored in the corresponding subdocument.

The system stores the subdocuments, including the respective related fragments (440). These can be stored, for example, in memory 108 or storage 126 of data processing system 100.

A process as disclosed herein is capable of handling input documents conforming to various XML schemas, in particular but not limited to when the schema is hierarchical in nature. Furthermore, the index data structure can be made to accommodate inheritance based schemas; a query for an XML element declared as a supertype in the schema will yield a result set containing also all elements declared as subtypes to that supertype.

Disclosed embodiments can extract all subdocuments from an arbitrarily large input document consisting of elements tuples X and Y (fragment X and Y), such that X.a==Y.b in linear time and in constant or linear memory, depending on how the data is stored. Furthermore, disclosed embodiments can select or create subdocuments using access to all logical expressions for extracting subdocuments.

Of course, those of skill in the art will recognize that, unless specifically indicated or required by the sequence of operations, certain steps in the processes described above may be omitted, performed concurrently or sequentially, or performed in a different order.

A two-index example for an XML document relating authors and written works is described below. In this example, the logical expressions consist of a single set of two query rules:

1) select all subtrees with root element Novel
2) select all subtrees with root element Author & Author.id=Novel.author The input document in this example is an XML file as follows:

```
<Publishing>
    <Play id="0" author="7">
    <Novel id="1" author="8"/>
    <Novel id="2" author="7"/>
    <Novel id="3" author="8"/>
    <ShortStory id="4" author="8"/>
    <ShortStory id="5" author="7"/>
    <Novel id="6" author="8"/>
    <Author id="7"/>
    <Author id="8"/>
</Publishing>
```

The system creates a first index index1, which can be, for example, a hashtable or database index, based on all the sets of query rules. The index contains the names of all elements constituting roots of subtrees/fragments to be extracted. For each name, the index contains a set of all its attributes used in any query rules. In this simple example, each attribute set only has one member:

```
index1:
    Novel->{author}
    Author->{id}
```

The system creates a second index index2, which can be, for example, a structure of nested hashtables and/or database indices, by performing a single sweep parsing process while referencing index1, such as an XML SAX parse:

```
index2:
    Novel -> { author -> {
                        7-> {<Novel id="2" author="7"/>}
                        8-> {<Novel id="1" author="8"/>,
                             <Novel id="3" author="8"/>,
                             <Novel id="6" author="8"/>
                            }
                        }
            ALL -> {<Novel id="2" author="7"/>,
                    <Novel id="1" author="8"/>,
                    <Novel id="3" author="8"/>,
                    <Novel id="6" author="8"/>
                   }
           }
    Author -> { id -> {
                        7-> {<Author id="7"/>}
                        8-> {<Author id="8"/>}
```

```
        }
ALL -> {<Author id="7"/>,
        <Author id="8"/>
        }
}
```

The system can then generate output subdocuments by applying all the sets of original query rules against index2.

The pseudo-code example below shows the logic and complexity for the lone set containing two queries of the example described above, but the implementation is query agnostic and able to handle any combination of supported query rules.

|  | Time complexity |
| --- | --- |
| Set novelXmls = index2.get("Novel").get("ALL"); | O(1) |
| for (each novelXML in novelXmls) { | O(n) |
|   emit novelXML; | O(1) |
|   emit index2.get("Author").get(novelXML.author) | O(1) |
| } |  |

Here, each iteration in the for-loop will produce one subdocument, with two fragments each. With the given data it would yield four subdocuments:

```
<Novel id="1" author="8"/>
<Author id="8"/>
<Novel id="2" author="7"/>
<Author id="7"/>
<Novel id="3" author="8"/>
<Author id="8"/>
<Novel id="6" author="8"/>
<Author id="8"/>
```

Disclosed processes can be used with real-world business data and query rules that are significantly more complex, and can also support type inheritance and fast secondary attribute lookup.

The example above, and cases like it, can be further optimized. For example, neither the ALL-entry of Author nor the author-entry of Novel is actually necessary to execute the query. These unnecessary entries have however no complexity impact on time or size so the example above does not remove them and so uses an index that is slightly larger than necessary.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC §112(f) unless the exact words "means for" are followed by a participle.

What is claimed is:

1. A method performed by a data processing system, comprising:
   receiving a document having fragments with attribute/value pairs;
   receiving logical expressions that define relationships between fragments of the document;
   analyzing the logical expressions to identify fragment names and attributes;
   creating an index based on the analysis that includes names of the fragments to be candidates for selection into subdocuments;
   extracting, from the document, all fragments named in the index;
   creating, in the index, an entry for each attribute/value pair;
   creating a plurality of subdocuments corresponding to the document, including finding top-level fragments in the index, finding second-level fragments related to each top-level fragment, and finding third-level fragments related to each second-level fragment; and
   storing the subdocuments, including the respective related fragments.

2. The method of claim 1, wherein the index also includes, for each named fragment, the attributes used in corresponding logical expressions.

3. The method of claim 1, wherein extracting the named fragments includes parsing values of each attribute according to the logical expressions.

4. The method of claim 1, wherein analyzing the logical expressions includes evaluating each logical expression with respect to which fragment attributes the logical expression operates on.

5. The method of claim 1, wherein the document is an XML document.

6. The method of claim 1, wherein the logical expressions are Xpath expressions.

7. A data processing system comprising:
   a processor; and
   an accessible memory, the data processing system particularly configured to receive a document having fragments with attribute/value pairs;
   receive logical expressions that define relationships between fragments of the document;

analyze the logical expressions to identify fragment names and attributes;

create an index based on the analysis that includes names of the fragments to be candidates for selection into subdocuments;

extract, from the document, all fragments named in the index;

create, in the index, an entry for each attribute/value pair;

create a plurality of subdocuments corresponding to the document, which includes finding top-level fragments in the index, finding second-level fragments related to each top-level fragment, and finding third-level fragments related to each second-level fragment; and store the subdocuments, including the respective related fragments.

8. The data processing system of claim 7, wherein the index also includes, for each named fragment, the attributes used in corresponding logical expressions.

9. The data processing system of claim 7, wherein extracting the named fragments includes parsing values of each attribute according to the logical expressions.

10. The data processing system of claim 7, wherein analyzing the logical expressions includes evaluating each logical expression with respect to which fragment attributes the logical expression operates on.

11. The data processing system of claim 7, wherein the document is an XML, document.

12. The data processing system of claim 7, wherein the logical expressions are Xpath expressions.

13. A non-transitory computer-readable medium encoded with executable instructions that, when executed, cause one or more data processing systems to:

receive a document having fragments with attribute/value pairs;

receive logical expressions that define relationships between fragments of the document;

analyze the logical expressions to identify fragment names and attributes;

create an index based on the analysis that includes names of the fragments to be candidates for selection into subdocuments;

extract, from the document, all fragments named in the index;

create, in the index, an entry for each attribute/value pair;

create a plurality of subdocuments corresponding to the document, which includes finding top-level fragments in the index, finding second-level fragments related to each top-level fragment, and finding third-level fragments related to each second-level fragment; and store the subdocuments, including the respective related fragments.

14. The computer-readable medium of claim 13, wherein the index also includes, for each named fragment, the attributes used in corresponding logical expressions.

15. The computer-readable medium of claim 13, wherein extracting the named fragments includes parsing values of each attribute according to the logical expressions.

16. The computer-readable medium of claim 13, wherein analyzing the logical expressions includes evaluating each logical expression with respect to which fragment attributes the logical expression operates on.

17. The computer-readable medium of claim 13, wherein the document is an XML, document and the logical expressions are Xpath expressions.

\* \* \* \* \*